2 Sheets—Sheet 1.
A. RUTLEDGE.
CULTIVATOR.
No. 174,577. Patented March 7, 1876.
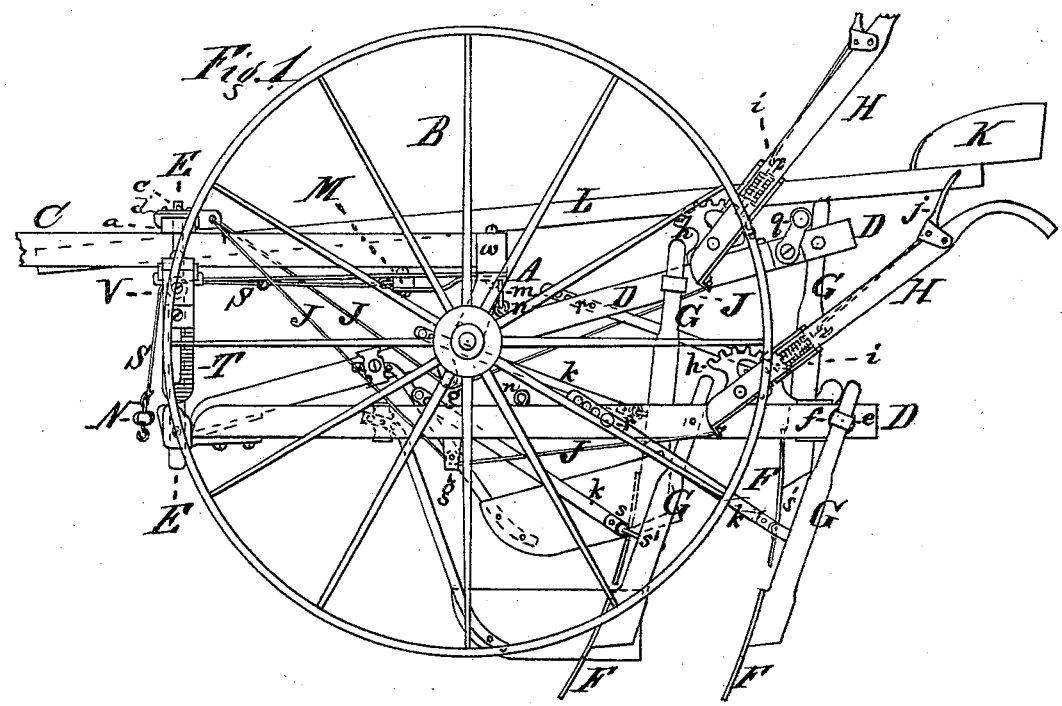
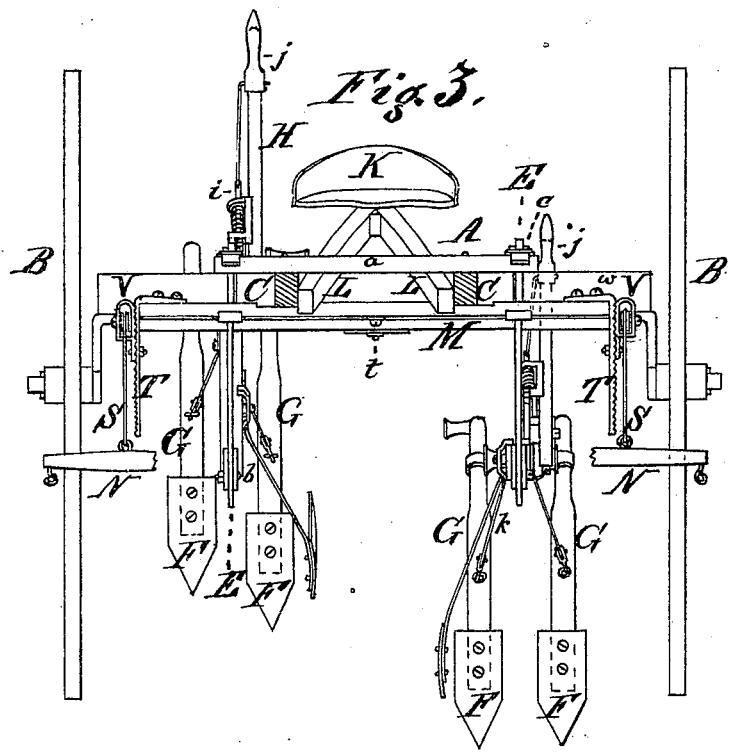
Witnesses
W. L. Remien
W. H. Isaacs
Inventor
Andrew Rutledge
by his Atty
E. S. Renwick

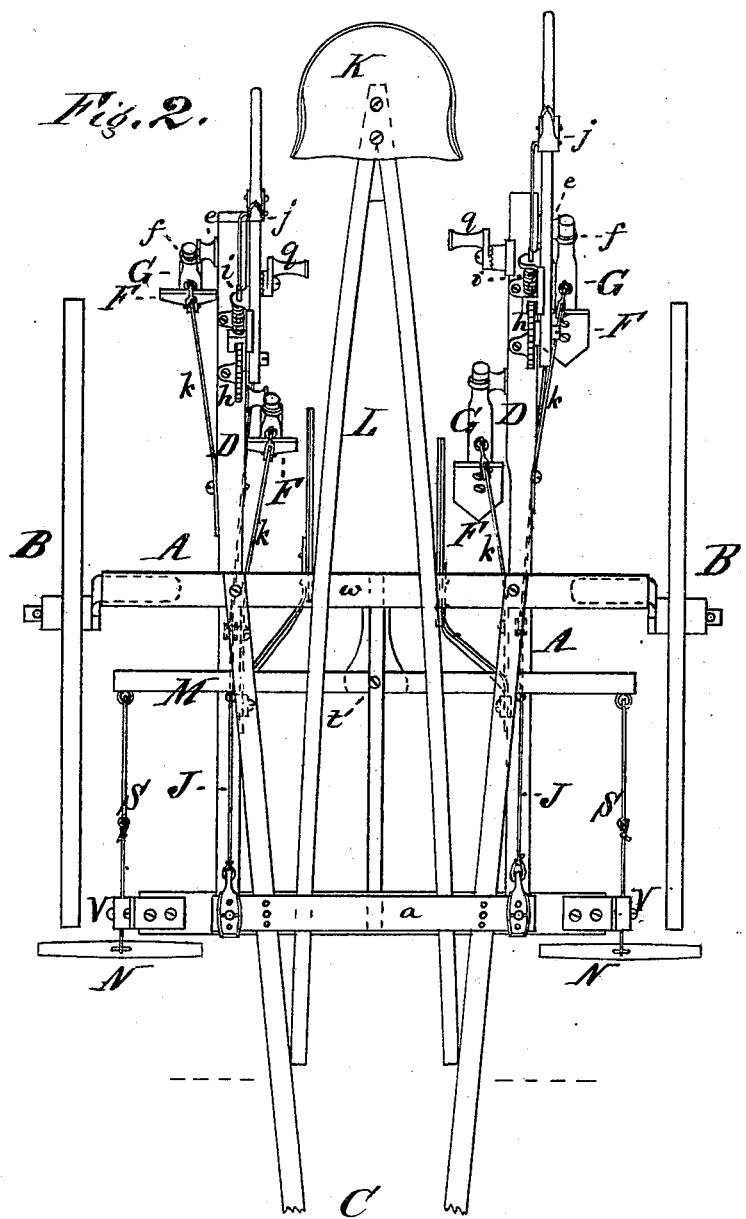

UNITED STATES PATENT OFFICE.

ANDREW RUTLEDGE, OF ROCKFORD, ILLINOIS, ASSIGNOR OF ONE-HALF HIS RIGHT TO WILLIAM A. KNOWLTON, OF SAME PLACE.

IMPROVEMENT IN CULTIVATORS.

Specification forming part of Letters Patent No. 174,577, dated March 7, 1876; application filed June 23, 1875.

*To all whom it may concern:*

Be it known that I, ANDREW RUTLEDGE, of Rockford, in the county of Winnebago and State of Illinois, have made an invention of certain new and useful Improvements in Cultivators; and that the following is a full, clear, and exact description and specification of the same.

My invention has reference to wheel-cultivators, in which the shovel-beams are connected with a frame supported on wheels; and the objects attained by it are the easy raising and lowering of the shovel-beams, the capacity to set the shovels quickly at any desired angle with the beam, or at any required distance from it, and the adjustment of the draft, as required to adapt the cultivator for use as either a riding-cultivator or as a walking-cultivator, or for other purposes. To these ends the invention consists of certain combinations of devices which are recited in the claims at the close of this specification.

In order that the invention may be fully understood, I have represented in the accompanying drawings, and will proceed to describe, a cultivator embodying it in the best form at present known to me.

Figure 1 of said drawings represents a side view of the cultivator, with the two beams in different positions. Fig. 2 represents a plan of the same. Fig. 3 represents a vertical transverse section of the same.

The frame A of the cultivator, represented in the said drawings, is supported upon two running wheels, B B, and is provided with a draft-pole, C, which extends forward between the horses. This draft-pole is of the customary double form, the forward portion of it not being shown in the drawing on account of lack of space. The cultivator has two beams, D D, each of which is connected at its front end with the frame by means of a swivel-rod, E, whose upper end is arranged to turn in the cross-bar *a*, and whose lower end is connected with the beam by means of a horizontal pivot, *b*. The upper end of the swivel-rod E is prevented from dropping by means of a pin, *c*, inserted through the rod above the plate *d* on the frame in which the rod turns. By reason of this swivel-rod and pivot-connection, the rear of the beam is free to swing laterally and to be raised or lowered vertically. Each beam carries two shovels, F F, each of which is connected with its beam by means of a standard, G, whose upper end is round, and is passed through an eye-clamp, *f*. The stem of this clamp is screwed, is passed through a tubular rest, *e*, and through the beam, and is fitted with a nut, which, when turned in one direction, loosens the shovel-standard, and when turned in the other secures it. By reason of this eye-clamp connection, and of the round form of the standard, each shovel can be quickly set at a greater or less distance from the beam, and also at any required angle therewith.

In order that each beam may be readily raised or lowered, each is fitted with a hand-lever, H, which is pivoted to the beam, extends below it, and has its lower end connected with the frame of the machine by means of a flexible connection, J, which is passed through the beam D at a point intermediate between its ends. At this place a pulley-sheave, *g*, is applied to the beam so as to reduce the friction. By reason of this connection of the lever with the frame of the machine, and with an intermediate part of the beam, it results that when the handle of the lever is raised the beam is easily pulled upward thereby toward the frame, and the shovels are raised, and, on the other hand, the beam and shovels may be lowered by permitting the handle of the lever to turn backward.

The pulley before mentioned constitutes a bearing for the flexible connection at a part of the beam intermediate between its ends; but it is not essential that the bearing provided at this intermediate point should have the form of a pulley-sheave turning upon a pivot, because a fixed guide secured to the shovel-beam may be used as the bearing for the flexible connection, or the bearing may be formed by the upper side of the passage through the shovel-beam at the intermediate point.

In order that the shovels, while working, may be held in any desired position, a toothed segment, *h*, is fixed to the beam, and a spring-bolt, *i*, is provided, to engage in the notches between the teeth. The bolt, also, is connected with a handle, j, so that the operator may manipulate the spring-bolt at the same time that he grasps the hand-lever H for the purpose of manipulating the beam.

In order that the shovels may be readily suspended from the frame at a sufficient distance to clear the ground while the machine is being moved from place to place, a double hook, m, is secured to the frame, and an eye, n, is secured to the beam D, so that the eye of the beam may be readily hooked upon one of the prongs of the hook after the beam and shovels are raised. When the beam is thus hooked the shovels are suspended from the frame sufficiently to clear the ground. In order to hold each shovel firmly to the beam each standard is connected with the beam by a brace, k, which is connected at one end with the lower part of the standard by means of eyes $s\ s'$, (which permit the standard to be turned on its axis,) and is connected at its front end with the beam by means of a screw-bolt, r, passed through one of a series of holes in the brace to permit the adjustment of the inclination of the standard and its shovel.

The cultivator, as thus far described, is adapted to be used either as a walking-cultivator or as a riding-cultivator. For the latter case I provide a driver's seat, K, supported by two bars, L, which are slipped over the main cross-bar w of the frame, and beneath the forward cross-bar a. This seat may be set in any convenient position for the operator, and in order that his legs may be supported a foot-rest, q, is secured to each beam. These foot-rests are of crank form, so that they may be adjusted to suit the operator by loosening the bolt that secures each to the beam, turning the foot-rest upon the bolt to the desired position, and screwing up the bolt.

The cultivator is provided with whiffletrees N N for the horses, and with an evener, M, which is fitted to vibrate on a pivot, t. In order that the whiffletrees may be readily set either high or low, to adapt the machine to use either as a riding-cultivator or as a walking-cultivator, each whiffletree is connected with the evener by means of a flexible connection, composed in this case of a link and chain, S, which last is passed through an adjustable clamp pulley-block, V, said block being toothed at one side and applied to the toothed side of a slotted and toothed bracket, T, and being secured to the said bracket by screw-bolts. When the said bolts are slacked the pulley-block may be adjusted up or down on the bracket, so as to determine the point of draft, as required. If the machine is to be used as a riding-cultivator, the chain is passed over the sheave of the block, and the pulley is set high on the bracket, so that the downward draft of the horses counterbalances the weight of the driver on his seat. If the cultivator is to be used as a walking-cultivator, the whiffletree-chain is passed beneath the pulley, so that the upward draft prevents the weight of the tongue from bearing too strongly on the horses' necks. Ropes may be substituted for chains as the flexible connections of the machine, and they may be shortened or let out, as required in practice. If deemed expedient, the flexible connections for the hand-levers H may be connected with them above their pivots, instead of below them, and in this case each flexible connection J will, as before described, be applied to the beam at a point intermediate between the front end of the beam and the hand-lever, a pulley-sheave being applied to the beam at the intermediate point to reduce the friction. The flexible connection will pass from the pulley-sheave of the beam to the hand-lever above its pivot, where it will be made fast, and the operation of these levers will be reversed.

I do not claim, broadly, the combination of the main frame, the shovel-beam, the hand-lever, and a flexible connection extended from the main frame to its connection with the hand-lever; but

I claim as my invention—

1. The combination, substantially as before set forth, of the main frame, the hand-lever, the flexible connection, and the shovel-beam, provided with an intermediate bearing, to which the flexible connection is applied.

2. The combination, substantially as before set forth, of the vibrating evener, the whiffletrees, the clamp pulley-blocks, the brackets therefor, and the flexible connections between the whiffletrees and the evener.

Witness my hand this 8th day of June, A. D. 1875.

ANDREW RUTLEDGE.

Witnesses:
DUNCAN FERGUSON,
ROB. H. SINKER.